(12) United States Patent
Lin et al.

(10) Patent No.: US 6,728,318 B2
(45) Date of Patent: Apr. 27, 2004

(54) ERROR RECOVERY OF CORRUPTED MPEG-4 BITSTREAMS USING FUZZY DECODING OF START CODES AND RESYNC MARKERS

(75) Inventors: Tao Lin, Fremont, CA (US); Stephen Molloy, Los Gatos, CA (US)

(73) Assignee: RedRock Semiconductor, Ltd., Sunnyvale, CA (US)

( * ) Notice: Subject to any disclaimer, the term of this patent is extended or adjusted under 35 U.S.C. 154(b) by 601 days.

(21) Appl. No.: 09/681,234

(22) Filed: Mar. 2, 2001

(65) Prior Publication Data

US 2002/0122490 A1 Sep. 5, 2002

(51) Int. Cl.[7] .................. H04N 7/12; H04N 11/04
(52) U.S. Cl. .................. 375/240.27; 375/240.28; 375/369
(58) Field of Search .................. 375/240.27, 240.28, 375/369, 240.08

(56) References Cited

U.S. PATENT DOCUMENTS

| | | | |
|---|---|---|---|
| 4,847,877 A | 7/1989 | Besseyre | 375/116 |
| 5,392,129 A | 2/1995 | Ohtaka et al. | 358/336 |
| 5,410,553 A | 4/1995 | Choon | 371/31 |
| 5,442,401 A | 8/1995 | Murakami et al. | 348/405 |
| 5,455,629 A | 10/1995 | Sun et al. | 348/466 |
| 5,475,694 A | 12/1995 | Ivanov et al. | 371/22.4 |
| 5,727,036 A | 3/1998 | Maertens | 375/369 |
| 5,767,799 A | 6/1998 | Maertens et al. | 341/67 |
| 5,910,827 A * | 6/1999 | Kwan et al. | 375/240.27 |
| 6,052,415 A * | 4/2000 | Carr et al. | 375/240.12 |
| 6,057,884 A | 5/2000 | Chen et al. | 348/416 |
| 6,141,385 A | 10/2000 | Yamaji | 375/240.27 |
| 6,304,607 B1 * | 10/2001 | Talluri et al. | 375/240.27 |
| 6,351,494 B1 * | 2/2002 | Kondo et al. | 375/240.27 |
| 6,658,153 B1 * | 12/2003 | Nakagawa et al. | 382/233 |

OTHER PUBLICATIONS

Fukunaga et al., "MPEG-4 Video Verification Model version 13.3", ISO/IEC JTC1/SC29/WG11, MPEG99/4960. Oct. 1999, pp. 1-18, 75-80, 105, 115-140, 160-193.

* cited by examiner

Primary Examiner—Chris Kelley
Assistant Examiner—Charles Parsons
(74) Attorney, Agent, or Firm—Stuart T. Auvinen

(57) ABSTRACT

A decoder for motion-picture-experts group (MPEG-4) video detects start codes at the beginning of video object planes (VOP) and resync markers at the start of each video packet (VP) in the VOP. When an error occurs in the bitstream, a parser searched for a next start code or resync marker to find the start of the next video packet. A partial match of the unique start-code bit sequence signals a fuzzy match, allowing the VOP header and data to be decoded even when bit errors occur in the VOP start code. A fuzzy match of the shorter resync marker can also be enabled. Fuzzy matching of VOP start codes and resync markers allows for faster recovery from corrupted bitstreams such as those transmitted over wireless networks.

20 Claims, 6 Drawing Sheets

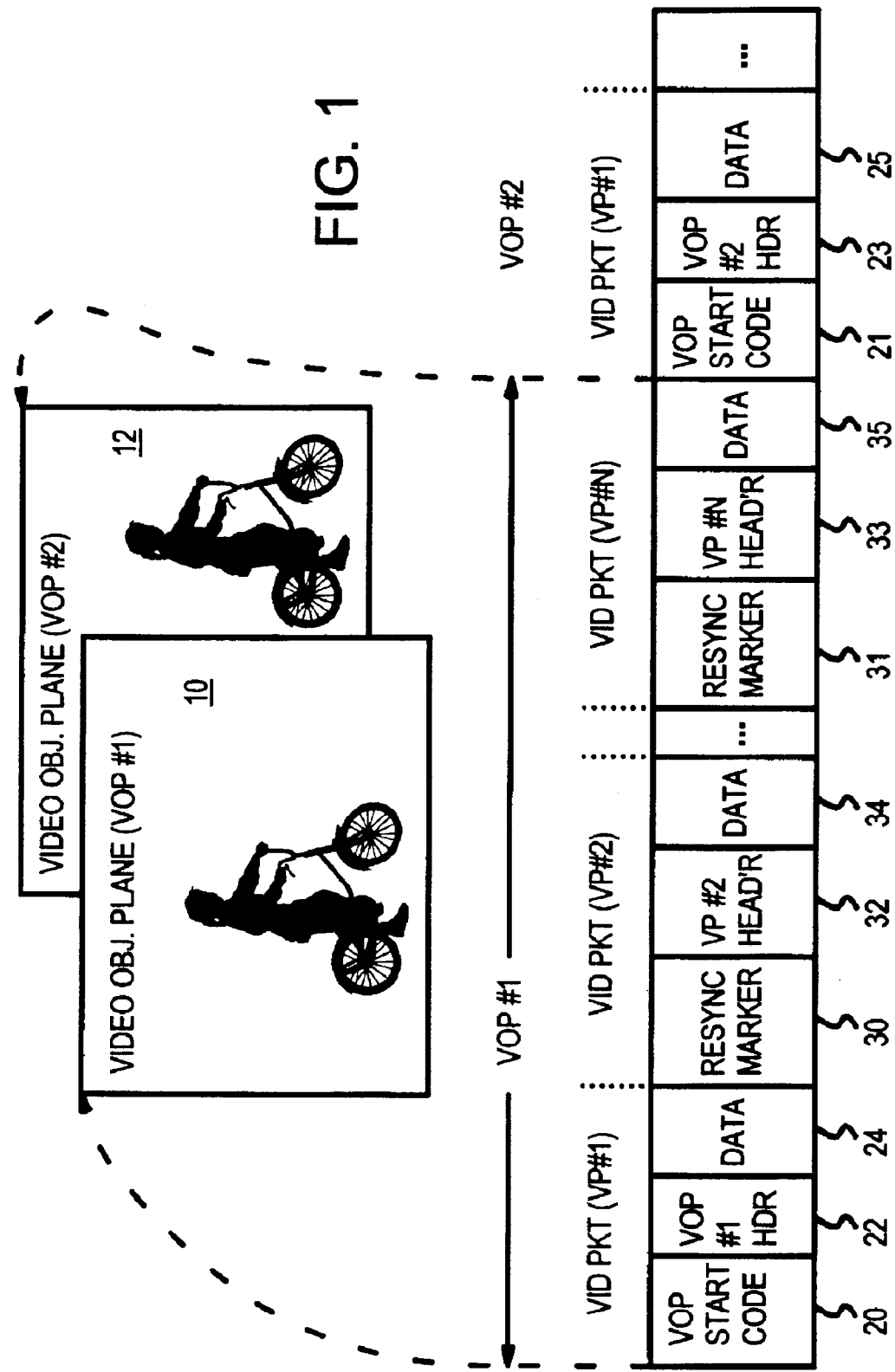

FIG. 2A

VOP START CODE:

| F_CODE | RESYNC MARKER |
|---|---|
| 1 | 0000 0000 0000 0000 1 |
| 2 | 0000 0000 0000 0000 01 |
| 3 | 0000 0000 0000 0000 001 |
| 4 | 0000 0000 0000 0000 0001 |
| 5 | 0000 0000 0000 0000 0000 1 |
| 6 | 0000 0000 0000 0000 0000 01 |
| 7 | 0000 0000 0000 0000 0000 001 |

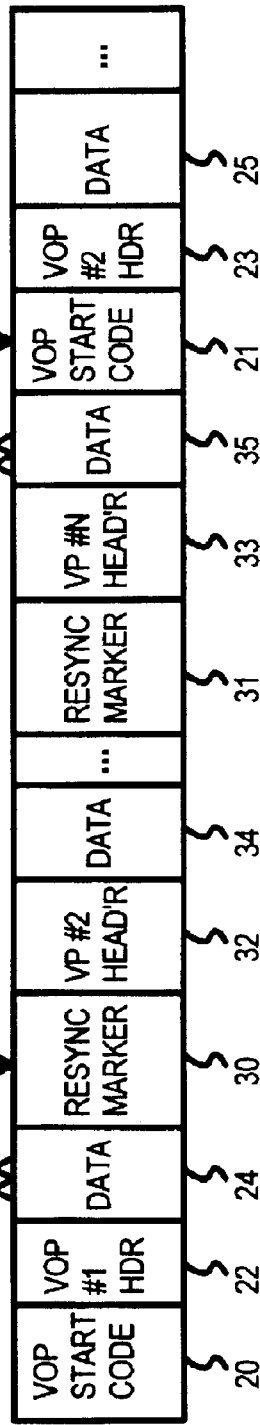
FIG. 4A
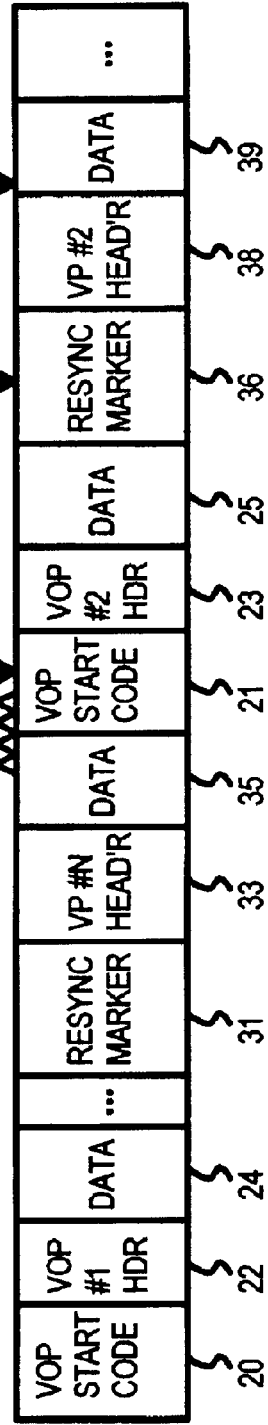
FIG. 4B

ERROR RECOVERY OF CORRUPTED MPEG-4 BITSTREAMS USING FUZZY DECODING OF START CODES AND RESYNC MARKERS

BACKGROUND OF INVENTION

This invention relates to video compression, and more particularly to error recovery from errors in synchronization fields.

Video is a key part of a rich multimedia experience. Personal computers (PC's) and various other computing devices have delivered video feeds to users over the Internet. However, processing of video bitstreams or feeds is among the most data-intensive of all common computing applications. Limited communication-line bandwidth has reduced the quality of Internet video, which is often delivered in small on-screen windows with jerky movement.

To mitigate the problems of large video streams, various video-compression techniques have been deployed. Compression standards, such as those developed by the motion-picture-experts group (MPEG), have been widely adopted. These compression techniques are lossy techniques, since some of the picture information is discarded to increase the compression ratio. However, compression ratios of 99% or more have been achieved with minimal noticeable picture degradation.

Portable hand-held devices such as personal-digital-assistants and cellular telephones are widely seen today. Wireless services allow these devices to access data networks and even view portions of web pages. Currently the limited bandwidth of these wireless networks limits the web viewing experience to mostly text-based portions of web pages. However, future wireless networks are being planned that should have much higher data transmission rates, allowing graphics and even video to be transmitted to portable computing and communication devices.

Although proponents of these next-generation wireless networks believe that bandwidths will be high enough for high-quality video streams, the inventors realize that the actual data rates delivered by wireless networks can be significantly lower than theoretical maximum rates, and can vary with conditions and local interference. Due to its high data requirements, video is likely to be the most sensitive service to any reduced data rates. Interference can cause intermittent dropped data over the wireless networks.

Next-generation compression standards have been developed for transmitting video over such wireless networks. The MPEG-4 standard provides a more robust compression technique for transmission over wireless networks. Recovery can occur when parts of the MPEG-4 bitstream is corrupted.

FIG. 1 shows a MPEG-4 bitstream that is composed of video object planes and video packets. The video is sent as a series of picture frames known as video object planes (VOP). These picture frames are replaced at a fixed rate, such as every 30 milliseconds to give the illusion of picture movement. Rather than transmit every pixel on each line, the picture is divided into macroblocks and compressed by searching for similar macroblocks in earlier or later frames and then replacing the macroblock with a motion vector or data changes.

Video object planes VOP 10, 12 are two frames in a sequence of many frames that form a video stream. Pixel data in these planes are compressed using macroblock-compression techniques that are well-known and defined by the MPEG-4 standard. The compressed picture data is divided into several video packets (VP) for each video object plane VOP.

Each video object plane begins with a VOP start code, such as VOP start code 20 which begins VOP #1 (10), an VOP start code 21, which begins VOP #2 (12). First video object plane VOP 10 has VOP header 22 that follows VOP start code 20, and data field 24 which contains the beginning of the picture data for VOP 10. After a predetermined amount of data, such as 100 to 1000 bits, a new video packet begins with resync marker 30 and VP header 32. Data field 34 continues with the picture data for VOP 10. Other video packets follow, each beginning with a resync marker and VP header, followed by a data field with more of the picture data for VOP 10. The last video packet VP #N in VOP 10 begins with resync marker 31 and VP header 33, and is followed by the final picture data for VOP 10, in data field 35.

The second video object plane VOP 12 begins with VOP start code 21 and VOP header 23, and is followed by data field 25, which has the first picture data for the second picture frame, VOP 12. Other video packets follow for VOP 12.

The VOP headers include a VOP coding type (I, P, or B), VOP time, rounding type, quantization scale, f-code, while the VP headers include a macroblock number for the first macroblock in the packet, quantization scale, VOP coding type and time. The headers can include other information as well.

The VOP start codes and VP resync markers contain unique bit patterns that do not occur in the headers or data fields. FIG. 2A shows a video object plane VOP start code. This code is defined by the MPEG-4 standard. The start code is 000001 B6 in Hexadecimal notation. The start code begins with a string of 23 zero bits. The picture data in the data fields are encoded so that they never have such a long string or run of zero bits. Likewise, the headers do not have such a long run of zero bits. Thus the start code is unique within the video bitstream, allowing a bitstream decoder to easily detect the start code.

FIG. 2B is a table of codes for the resync markers that marks the beginning of a new video packet. The f-code specifies the motion vector search range and the number of bits that can be used to encode the motion vector. For f-code=1, the maximum search range is +/−16 pixels, with a half-pixel resolution.

All resync markers begin with a long run of zero bits, from 16 to 22 bits of zero. Note that the VOP start code has a longer run of 23 zero bits, allowing the VOP start code to be distinguished from the VP resync markers.

A simplification of the MPEG-4 standard sets the f-code to 1 for all video packets. This simplification is known as simple profile level 0. In this case the resync markers are:

0000 0000 0000 0000 1 which has an initial run of 16 zeros.

FIG. 3 is a diagram of an MPEG-4 decoder. The MPEG-4 bitstream is parsed by parser 50, which searched for start-code and resync bit patterns. A bit-wise comparator can be used, comparing the last Q bits received to a Q-bit pattern of the start code or resync marker. When the last Q bits match the VOP start code, start-code decoder 56 instructs bitstream decoder 52 to decode the following bits as the VOP header, followed by the data field of the initial video packet. The picture data from the data field is output as the video data for further processing of motion vectors and macroblocks (de-compression).

When the last Q bits received by parser 50 match a resync bit pattern, resync marker decoder 58 instructs bitstream decoder 52 to decode the following bits as the VP header, followed by the data field for the video packet. The picture data from the data field is output as the video data for further processing of motion vectors and macroblocks.

When the bit pattern is neither a start code, nor a resync marker or their headers, macroblock decoder 55 decodes the data fields into the macroblock descriptions, motion vectors, and discrete cosine transform (DCT) coefficients of the picture data.

Errors can be detected when an invalid motion vector or discrete cosine transform (DCT) code is found. However, there is no standard error-detection method. When an error is detected by bitstream decoder 52 parser 50 is instructed to search for the next VOP start-code or VP resync marker. Any data in the bitstream is ignored once the error occurs until the next start code or resync marker is found. When start-code decoder 56 finds a start code in the bitstream, decoding can continue with the next VOP header. The data following the VOP header is processed, but any video data after the error until the VOP header is discarded since the location of the macroblocks and motion vectors in the bitstream are uncertain due to loss of sync from the error. Backward decoding may be used to recover some of the lost video data when reversible variable-length coding is used.

When resync marker decoder 58 finds a resync marker in the bitstream, decoding can continue with the next VP header. The data following the VP header is processed, but any video data after the error until the VP header is discarded due to the loss sync caused by the error. If reversible variable-length coding is used, some of the lost video data may be recovered by backward decoding.

When an error occurs, the remaining data in the video packet is lost. However, data in the next video packet can be used since the bitstream is re-synced by detection of the unique bit pattern, either the start code or resync marker.

FIG. 4A shows recovery from bit errors in a video packet. When the bitstream is transmitted over a wireless network, some corruption of the data is possible. In this example, a data error occurs in data field 24 in the first video packet of VOP #1. The remaining data in data field 24 is discarded, but the decoder searches for and finds the next resync marker 30. VP header 32 following resync marker 30 is decoded, and data processing resumes with data field 34 in the second video packet. Thus the only data lost is some of the data in data field 24.

Another bit error occurs in data field 35 in the last video packet of the first frame, VOP #1. The remaining data in data field 35 is lost. However, start code 21 is detected for the second frame, VOP #2. Second VOP header 23 is decoded, and data processing resumes with the data in data field 25.

Dividing data from each video object plane into several video packets reduces the amount of lost data when a bitstream error occurs. Data from just one video packet is lost for each error. Only a portion of a frame is lost, such as less than 1/Nth of a frame when the video object plane is divided into N video packets.

Unfortunately, some kinds of bit errors are more difficult to recover from. FIG. 4B shows recovery from bit errors that extend into start codes and resync markers. A bit error in data field 35 extends into VOP start code 21, causing corruption of both data and the next start code. Since the bit error corrupts bits in the VOP start code, the decoder is unable to match the bitstream in VOP start code 21 with the proper start code sequence. Thus the start of the video object plane is not found. VOP header 23 cannot be decoded, and data in data field 25 is discarded since the exact start of this field is not known.

The decoder finally is able to match resync marker 36 for the second video packet in VOP #2 to the expected bit pattern for the resync marker. VP header 37 is decoded, and picture data from data field 39 is processed. Data from data field 25 is lost, along with some of the data from data field 35. Thus all data from the first video packet is lost, as well as some of the data from the last packet of VOP #1. Parts of two video packets are thus lost when an error occurs in a start code or resync marker.

What is desired is a bitstream decoder that locates start codes and resync markers of video packets despite bit errors that occur in these start codes and resync markers. A robust sync detector is desired that can more quickly recover from bitstream errors is desirable. A MPEG-4 decoder that can recover from a corrupted bitstream within one video packet is desirable to minimize loss of picture data.

BRIEF DESCRIPTION OF DRAWINGS

FIG. 1 shows a MPEG-4 bitstream that is composed of video object planes and video packets.

FIG. 2A shows a video object plane VOP start code.

FIG. 2B is a table of codes for the resync markers that marks the beginning of a new video packet.

FIG. 4A shows recovery from bit errors in a video packet.

FIG. 4B shows recovery from bit errors that extend into start codes and resync markers.

DETAILED DESCRIPTION

The present invention relates to an improvement in error-recovery for corrupted MPEG bitstreams. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The video object plane (VOP) start code includes a run of 23 zero bits followed by 1B6 Hex, which does not occur anywhere else in the bitstream. Likewise, the resync markers that mark the next video packet (VP) have a unique pattern of 16 zero bits followed by a 1. This pattern can only occur in the resync marker, or as a subset of the start code.

To allow for detection of the start code and resync markers when bit errors occur in these codes or markers, the inventor allows for some bits to mismatch. When a bit sequence or pattern almost matches the start code or resync marker, a match is still signaled. Thus some corruption of the start codes and resync markers is tolerated.

Some of the bits in the start code can be masked off from the bit comparison, for example, a fuzzy start code is:

0000 0000 0000 0000 0XXX XXXX 1011 0110 where X can be either a 1 or a 0 bit. Thus a match to the fuzzy start code is signaled when a run of 17 zero bits is followed by any 7 bits which are followed by B6 Hex. This fuzzy start code allows for data corruption to occur in the middle of the start code. Another fuzzy start code is:

XXXX XX00 0000 0000 0000 0001 1011 0110 which allows for data corruption in the first 6 bits of the start code. The sequence of 15 zero bits followed by 1B6 Hex is still unique.

A fuzzy resync marker is:

XXXX 0000 0000 0000 1 which allows for bit errors in the first four bits of the resync marker. When the motion-vector search range is small, more bits can be masked off in the resync marker since motion-vector numbers with many zeros do not occur in the data field.

Alternatively, an exact match can be required for the resync marker, while one or more of the fuzzy start codes can be accepted as a valid start code. The longer length of the start code allows for more mismatched bits while still having a unique bit sequence. When several bits are masked off in the shorter resync marker, the remaining bit sequence may not be unique, presenting the possibility of a false resync detection in a data pattern.

Figure 3:
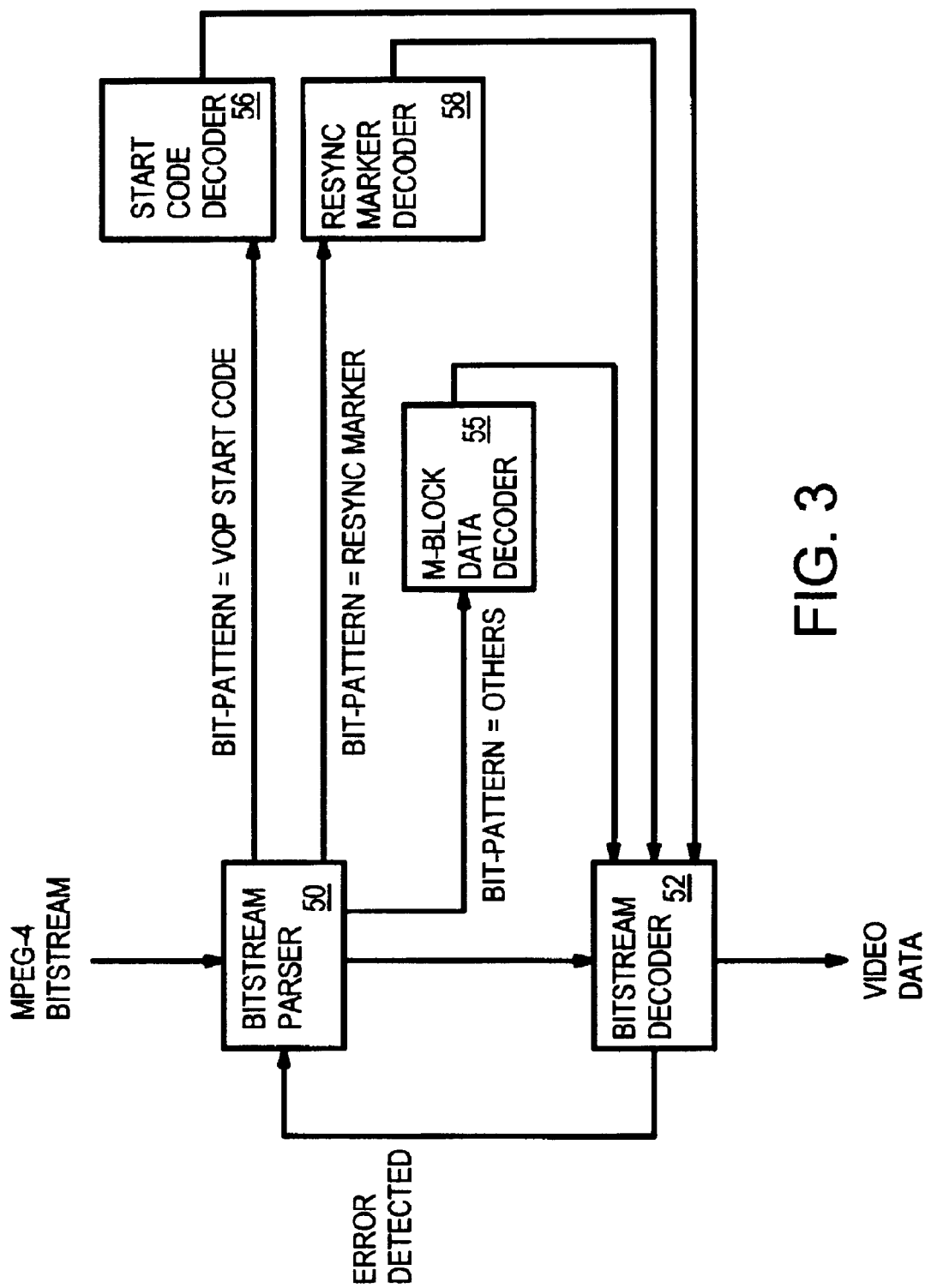
FIG. 3 is a diagram of an MPEG-4 decoder.
Figure 5:
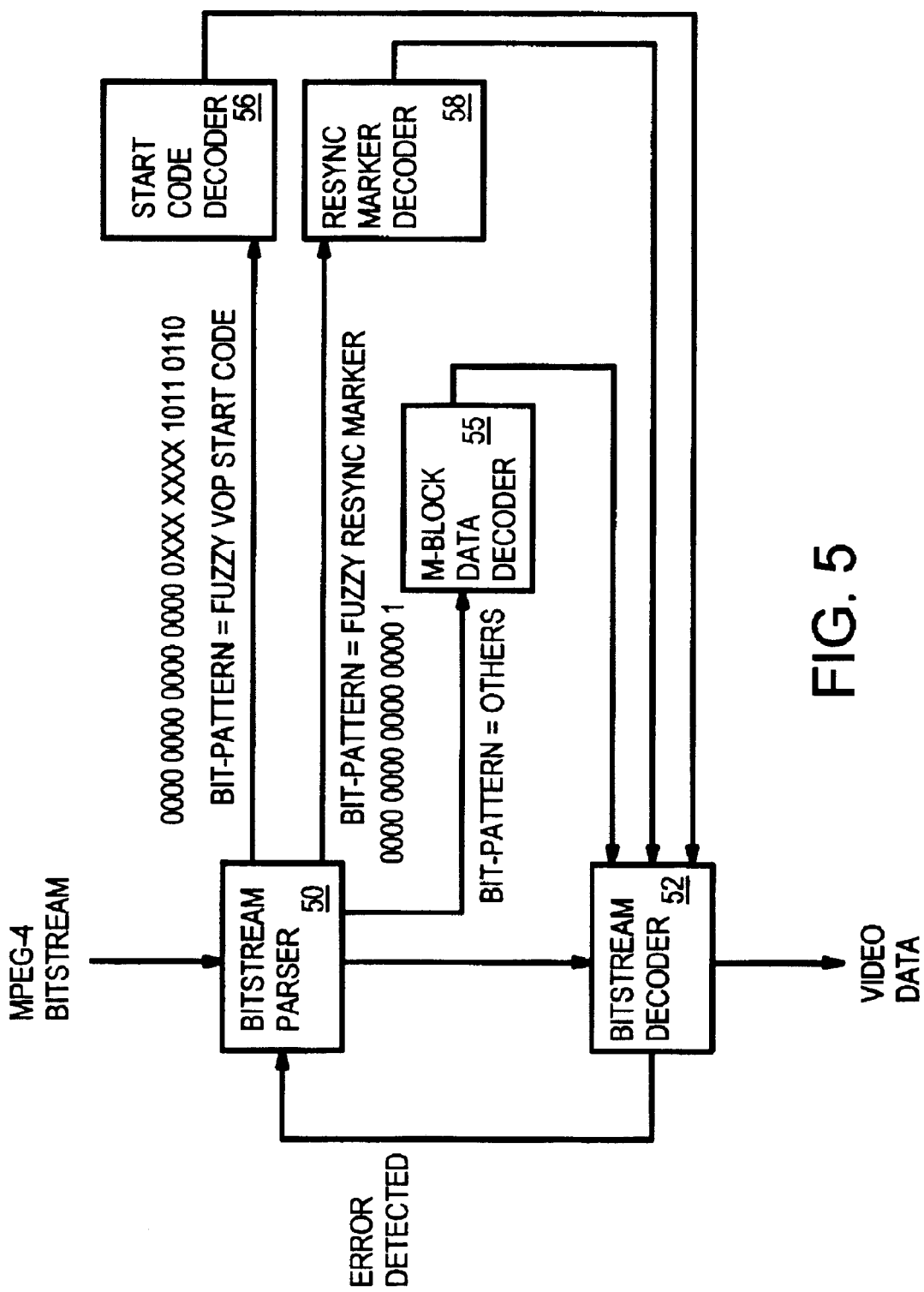
FIG. 5 shows a portion of a bitstream processor that detects fuzzy start codes when the bitstream is corrupted.

FIG. 5 shows a portion of a bitstream processor that detects fuzzy start codes when the bitstream is corrupted. A bitstream in MPEG-4 format is parsed by parser 50 with bit sequences compared to a fuzzy start code and a fuzzy resync marker. When bitstream decoder 52 detects an error, parser 50 searches the bitstream for the next start code or resync marker. When a sequence of bits from parser 50 matches the fuzzy start code, decoder 56 instructs bitstream decoder 52 to decode the next VOP header. The bit sequence may only partially match the start code, since some of the bits in the fuzzy start code are masked off from the bit comparison.

When a sequence of bits from parser 50 matches the fuzzy resync marker, decoder 58 instructs bitstream decoder 52 to decode the next VP header. The picture data bits are output from bitstream decoder 52, while the start codes, resync markers, and headers are stripped off. The header information can be sent to control logic for the de-compressors that receive the picture data.

When the bit pattern is neither a fuzzy start code, nor a fuzzy resync marker or their headers, macroblock decoder 55 decodes the data fields into the macroblock descriptions, motion vectors, and DCT coefficients of the picture data.

In the example shown, an exact match is required for the resync marker, but a fuzzy match is allowed for the start code. The start code can have up to 7 bits corrupted in the middle of the start code and detection still occur.

Figure 6:
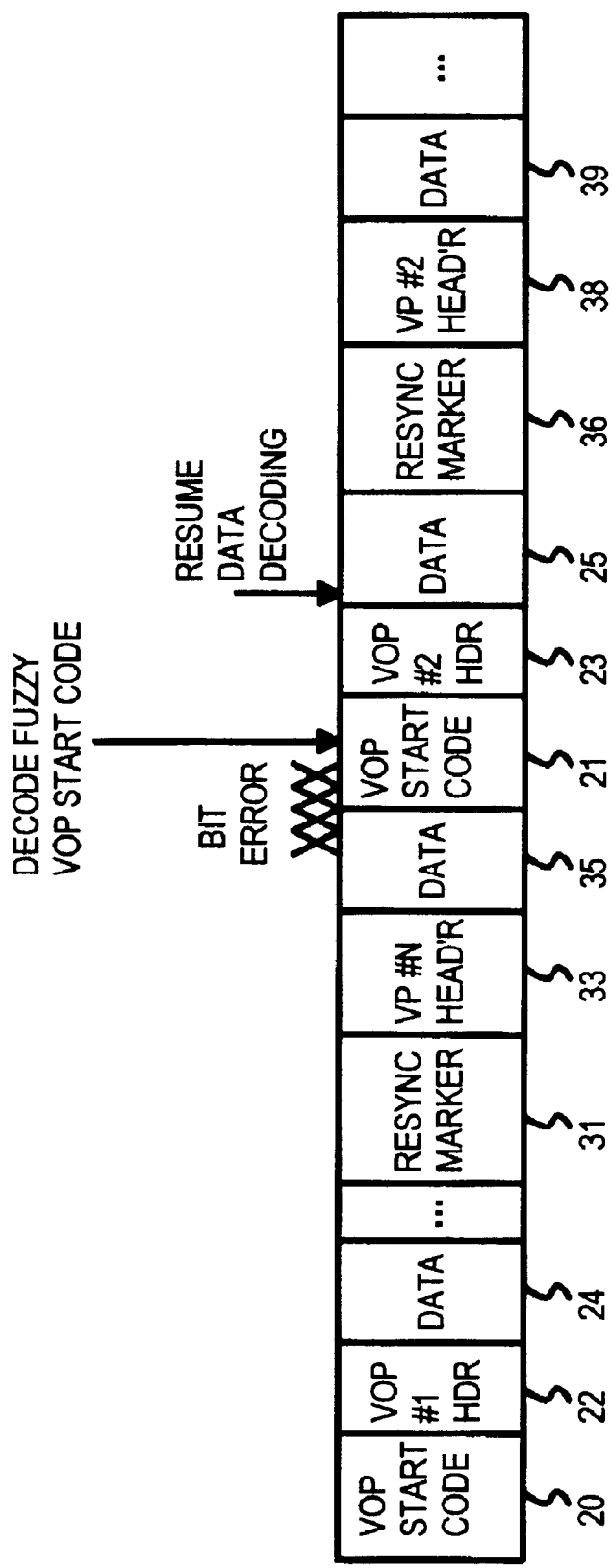
FIG. 6 shows that recovery from a bitstream error can be faster when fuzzy matching of the start codes occurs.

FIG. 6 shows that recovery from a bitstream error can be faster when fuzzy matching of the start codes occurs. Bitstream errors occur in data field 35 and second start code 21. Alternately, the bit errors could occur just within start code 21 and not in data field 35.

Although bit errors occur in start code 21, the errors occur in bits that are masked off in the fuzzy start code. Thus a fuzzy match of the start code can be signaled. The bitstream decoder decodes VOP header 23 that follows the fuzzy start code, and picture data from data field 25 can be sent to the de-compressor. Thus data decoding resumes immediately after the bit error, with little or no loss of actual picture data.

In contrast, FIG. 4B showed that without fuzzy detection, data decoding could not resume until next data field 39, after the next resync marker 36 is detected. An entire video packet of picture data is recoverable using the fuzzy matching technique. The first video packet of VOP #2 is usable with fuzzy matching, but not with full-bit matching of the start codes. Thus video degradation is reduced when bitstream corruption occurs, such as for wireless transmission of video.

Alternate Embodiments

Several other embodiments are contemplated by the inventors. For example the decoders can be implemented in a variety of ways, such as by firmware routines in a digital-signal processor (DSP) chip, or in logic in a logic array chip, or as software routines executed by a processor, or a combination of techniques. The decoder, parser, and bit comparators can be partitioned in many different ways, and the bit comparison for fuzzy matching can be performed serially by a state machine, or in parallel using a shift register. A programmable register can allows the fuzzy matching to be disabled, or allow for different bits to be masked off from comparison.

The fuzzy matching can be enabled only after a bitstream error is detected, while full-pattern matching is required when no errors occur. Rather than specify exactly which bits are masked off in the fuzzy start code, statistical matching can be performed. The number of mismatched bits can be counted and compared to a mismatch threshold. When the number of mismatched bits is below the threshold, a fuzzy match is signaled. This allows for bit errors to occur in varying locations within the start code or resync marker. A combination of techniques may be used, such as signaling the fuzzy match when no more than 1 bit mismatches, or when the only mismatching bits are in a specified mask location. Alternately, any fuzzy match may require that certain key bits match, such as the B6 Hex ending of the start code. The statistical matching may be restricted to a portion of the start code sequence.

In the most general case, the fuzzy start code may be a set of predetermined bit patterns that contain some of the pattern of bits in the start code. More complex logic or algorithms can be used to determine if a particular sequence of bits in the bitstream belongs to the set of codes in the fuzzy start code. For example, the only valid pattern in the data fields with 15 consecutive zero bits could be:

xxx0 0001 0000 0000 0000 0001 xxxx xxxx.

A fuzzy start code then could include the following patterns:

xxxY YYY1 0000 0000 0000 0001 1011 0110 where Y is not 0000. There are a total of (2**4)-1 or 15 patterns in this set of fuzzy start codes. Note that the 1 following the Y allows for matching a bit error in the start code, since the error-free start code has a zero bit in this position. Of course, a set of fuzzy resync markers could also be generated in a similar manner. The fuzzy start code still includes at least a portion of the full start code. In the example above, the fuzzy start code includes the portion 0000 0000 0000 0001 1011 0110 of the full start code.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A fuzzy bitstream decoder comprising:
a bitstream parser, receiving a bitstream containing bit errors, the bitstream encoding compressed video arranged as video object planes each having a plurality of video packets;
a fuzzy start-code decoder, coupled to the bitstream parser, for detecting a fuzzy start code in the bitstream, the fuzzy start code including at least a portion of a start code, the start code for marking a start of a video object plane;
a resync marker decoder, coupled to the bitstream parser, for detecting a resync marker in the bitstream, the resync marker for marking a beginning of a video packet; and
a macroblock decoder, coupled to the bitstream parser, for extracting video macroblocks from data fields in the bitstream;
wherein a corrupted start code in a corrupted bitstream is detected when bit errors occur in the start code but not in the fuzzy start code portion of the start code, whereby the bitstream is recovered from the corrupted start code.

2. The fuzzy bitstream decoder of claim 1 wherein each video packet comprises a resync marker or a start code followed by a header and a data field, the data field containing video macroblocks.

3. The fuzzy bitstream decoder of claim 2 wherein the macroblock decoder extracts video macroblocks from a data field of a corrupted video packet, the corrupted video packet having a bit error in the start code but not in the at least a portion of the start codes that is included in the fuzzy start code, whereby data is recovered from the corrupted video packet with the bit error in the start code.

4. The fuzzy bitstream decoder of claim 3 wherein the start code and the resync marker are unique bit sequences that do not occur in the data fields.

5. The fuzzy bitstream decoder of claim 4 wherein the start code includes a sequence of 23 zero bits followed by a one bit.

6. The fuzzy bitstream decoder of claim 5 wherein the resync marker is a sequence of 16 zero bits followed by a one bit.

7. The fuzzy bitstream decoder of claim 6 wherein the fuzzy start code is detected when a sequence of at least 17 zeros is detected.

8. The fuzzy bitstream decoder of claim 7 wherein the start code is 0000 0000 0000 0000 0000 0001 1011 0110 and wherein the fuzzy start code portion is XXXX XX00 0000 0000 0000 0001 1011 0110,
wherein X are bits that are in the start code but not in the fuzzy start code.

9. The fuzzy bitstream decoder of claim 3 further comprising:
an error detector, coupled to the macroblock decoder, for detecting an error in the bitstream, the error detector for activating the fuzzy start-code decoder to detect fuzzy start codes;
wherein decoding of the fuzzy start code is enabled when a bitstream error is detected.

10. The fuzzy bitstream decoder of claim 9 wherein the macroblock decoder extracts a motion vector, the motion vector indicating a change in location of a video macroblock from one video object plane to another video object plane in the bitstream.

11. The fuzzy bitstream decoder of claim 10 wherein the error detector signals an error when the motion vector is outside of a predetermined search range,
whereby corrupted motion vectors are detected.

12. The fuzzy bitstream decoder of claim 10 wherein the bitstream is an motion-picture-experts group (MPEG) encoded bitstream.

13. The fuzzy bitstream decoder of claim 12 wherein the bitstream is received from a wireless network, the wireless network introducing bit errors to the bitstream.

14. The fuzzy bitstream decoder of claim 3 wherein the resync marker decoder also detects a fuzzy resync marker, the fuzzy resync marker including at least a portion of the resync marker,
wherein a corrupted resync marker in a corrupted bitstream is detected when bit errors occur in the resync marker but not in a portion of the resync marker contained in the fuzzy resync marker,
whereby fuzzy decoding of resync markers is performed.

15. The fuzzy bitstream decoder of claim 14 wherein a motion-vector search range is limited, limiting a number of successive zero bits in the data fields to be less than a number of successive zero bits in the fuzzy resync marker.

16. An error-recovering motion-picture-experts group (MPEG) decoder comprising:
a bitstream input for receiving an MPEG bitstream, the MPEG bitstream being a sequence of video packets arranged into video object planes, each video object plane encoding an image frame of a video;
wherein each video packet after a first video packet in a video object plane begins with a resync marker, a header, and a data field;
wherein each video object plane begins with a start code, followed by a header and a data field for a first video packet in the video object plane;
a start-code detector, coupled to the bitstream input, for detecting the start code at a beginning of each new video object plane;
a resync-marker detector, coupled to the bitstream input, for detecting the resync marker at a beginning of video packets in the video object plane;
a macroblock processor, receiving data fields from the bitstream input, for processing macroblocks in the data fields, the macroblocks representing a portion of the image frame encoded by the video object plane; and
a fuzzy detector, coupled to the bitstream input, for detecting a partial match of the start code, the fuzzy detector signaling the macroblock processor to process macroblocks in the data field of a first video packet in a video object plane when the partial match is detected with a corrupted start code for the first video packet; whereby partial matches of the start code allow macroblocks to be processed.

17. The error-recovering MPEG decoder of claim 16 further comprising:

an error detector, coupled to the macroblock processor, for signaling the fuzzy detector to search for partial matches when a macroblock error is detected.

18. An motion-picture-experts group (MPEG) bitstream decoder comprising:

parser means for receiving a bitstream containing bit errors, the bitstream encoding compressed video arranged as video object planes each having a plurality of video packets;

fuzzy start-code decoder means, coupled to the parser means, for detecting a fuzzy start code in the bitstream, the fuzzy start code including a set of predetermined codes that match a portion of a start code, but have bit errors that do not match other portions of the start code, the start code for marking a start of a video object plane;

resync marker decoder means, coupled to the parser means, for detecting a resync marker in the bitstream, the resync marker for marking a beginning of a video packet; and macroblock decoder means, coupled to the parser means, for extracting video macroblocks from data fields in the bitstream;

wherein a corrupted start code in a corrupted bitstream is detected when bit errors occur in the start code but not in the fuzzy start code portion of the start code, whereby the bitstream is recovered from the corrupted start code.

19. The MPEG bitstream decoder of claim 18 wherein each video packet comprises a resync marker or a start code followed by a header and a data field, the data field containing video macroblocks;

wherein the macroblock decoder means includes means for extracting macroblocks from a data field of a corrupted video packet, the corrupted video packet having a bit error in the start code but not in the fuzzy start code, whereby data is recovered from the corrupted video packet with the bit error in the start code.

20. The MPEG bitstream decoder of claim 18 further comprising: error detector means, coupled to the macroblock decoder means, for activating the fuzzy start-code decoder means to search for the fuzzy start code when a macroblock error is detected.

* * * * *